Patented Apr. 14, 1942

2,279,450

UNITED STATES PATENT OFFICE 2,279,450

GASKET

Lloyd H. Diehl, Detroit, Mich., assignor to Detroit Gasket & Mfg. Co., Detroit, Mich., a corporation of Michigan No Drawing. Application January 8, 1941,
Serial No. 373,686

2 Claims. (Cl. 288—34)

This invention relates to gaskets and is particularly concerned with a gasket having a critical hardness characteristic and resistance to distortion whereby when the gasket is sealed under pressure, there will be no cutting or squeezing out of the gasket such as would cause a loss in sealing efficiency.

It is an object of the invention to provide such a gasket having a hardness of between substantially 75 and 100 as measured on a Shore durometer hardness gauge.

It is a further object of the invention to provide a gasket which is resistant to oils, organic solvents such as gasoline, as well as chemical washing solutions of which sal soda is an example.

It is another object of the invention to provide a gasket having permanent flexibility, resiliency, requisite hardness and tensile strength, as well as resistance to disintegration in the presence of oils and solvents, particularly when the gasket is subjected to high temperatures, for example, of substantially 300° F. and is under pressure.

In order to accomplish the aforementioned results I have discovered that a composition including one of the "elastic synthetics," i. e., so-called synthetic rubbers of the oil resistant type, such as "Neoprene," asbestos fibres, and comminuted cork can be satisfactorily prepared and will have a long life under severe conditions as, for example, when the gasket is used for sealing oil reservoirs, oil filters, oil pumps, and, in fact, many other applications requiring oil or liquid type joints such as are frequently associated with automotive engines.

Instead of "Neoprene" other commercially available "elastic synthetics" sold under the trade names of "Buna," "Perbunan," "Hycue," "Chemi-gum" and "Thiokol" may be used. Desirable combinations of two or more of the "elastic synthetics" may be also used. "Neoprene," "Buna," "Perbunan," "Hycue," and "Chemi-gum" are butadiene products, and "Thiokol" is a reaction product of dihalogenated organic compounds and soluble inorganic polysulfides.

Moreover, I have discovered that the relationship or proportion of ingredients is critical. That is to say, and taking, for example, "Neoprene," I find that based on the amount of "Neoprene" which is employed as a flexible and resilient binder, the amount of asbestos should be between 40% and 80%, preferably in the neighborhood of 65% by weight. The important considerations surrounding the use of the asbestos fibres are the development of the required hardness and tensile strength and the control of water absorptivity.

In connection with the comminuted cork content, preferably cork dust is used in amount of about 35% to 75%, preferably 60%, likewise based on the amount of "Neoprene" by weight. The important consideration as regards the inclusion of the cork dust is to provide resiliency without at the same time rendering the product brittle.

The "Neoprene" and asbestos fibres do not interfere with the properties of the cork and I find, that the three ingredients cooperate to provide a gasket having the desired compression and rebound or cushioning qualities for sealing purposes, and at the same time, the composition does not distort or evidence a squeezing out under pressure. In other words, the hardness of the composition and its ability to retain its shape under compression without cutting or flowing objectionably under sealing pressure have made available for the first time a gasket or sealing material useful for a wide field of application.

Not only does the gasket have a high tensile strength, and freedom from cutting and squeezing out under high sealing pressures, but these qualities persist in the presence of high temperatures, moisture, and organic solvents, and I have observed that under the most severe conditions the gasket retains its strength and resilient qualities, without evidence of shrinkage, and may even expand slightly after heating and cooling to produce an improved permanent seal.

The sealing material may be prepared in any desired form and in any suitable thickness, as for example, as rings or flat sheets.

One satisfactory composition comprises substantially 65% asbestos fibres and substantially 60% cork dust #30, each based on the weight of the "Neoprene" present. Customary rubber compounding ingredients including fillers, softeners, accelerators and vulcanizing agents are included in the composition. The batch is milled and calendered into suitable widths and may be formed into tubes for slicing into rings, or flat sheets, and then vulcanized. Such a composition gasket has a hardness of about 85 on the Shore durometer, resists a pressure of from 20 to 65 pounds as measured on a torque wrench, is oil and water resistant and is free from cutting or squeezing out after washing in sal soda at temperatures of 210° F. and higher under pressure.

In the example above noted, the weight of the asbestos fibres is 65% of the weight of the "Neoprene" and the weight of the comminuted cork is 60% of the weight of the "Neoprene," e. g., 10 pounds "Neoprene," 6.5 pounds asbestos and 6 pounds comminuted cork. The composition is, of course, prepared in batches of substantial size in commercial operations.

The proportions just set forth may be varied within the ranges herein set forth to produce gaskets satisfactory for numerous applications. For instance, a greater quantity of asbestos fibres may be employed to gain increased hardness where water absorptivity is not objectionable, and the cork content may be varied to control the compression and rebound bearing in mind that brittleness is to be avoided.

The percentages of cork and asbestos mentioned above are applicable to the other synthetics and will vary from one synthetic to another due mainly to the difference in specific gravity of the synthetic. The same volume loading is necessary to maintain the hardness and other qualities above recited and to do this, it is necessary to change the percentage by weight of the asbestos and cork to balance the volume of these two ingredients against the volume of the synthetic. The percentage ranges described herein are followed and a Shore durometer hardness of between substantially 75 and 100 is obtained.

This application is a continuation-in-part of my application, Serial No. 349,231, filed August 1, 1940.

I claim:

1. A gasket for use in locations exposed to the action of heat, oil, organic solvents, and caustic washing solutions comprising synthetic rubber, asbestos fibres, and comminuted cork, the said ingredients being in proportions effective to produce a gasket having a Shore durometer hardness of not less than 75 nor more than 100.

2. A gasket for use in locations exposed to the action of heat, oil, organic solvents, and caustic washing solutions comprising synthetic rubber, asbestos fibres, and comminuted cork, the said ingredients being in proportions effective to produce a gasket having a Shore durometer hardness of substantially 85.

LLOYD H. DIEHL.